United States Patent

[11] 3,571,787

[72] Inventors Milo M. Backus
Dallas;
Stephen C. Merdler, Dallas, Tex.
[21] Appl. No. 645,766
[22] Filed June 13, 1967
[45] Patented Mar. 23, 1971
[73] Assignee Texas Instruments Inc., Dallas, Texas

[54] METHOD AND SYSTEM FOR AUTOMATIC SEISMIC REFLECTION PICKING
10 Claims, 11 Drawing Figs.

[52] U.S. Cl. .................................................. 340/15.5
[51] Int. Cl. .................................................. G01v 1/28, G01v 1/34
[50] Field of Search .................................. 340/15.5, (FC), (DISD)

[56] References Cited
UNITED STATES PATENTS
3,099,814   7/1963   White et al. .................. 340/15.5

Primary Examiner—Rodney D. Bennett, Jr.
Assistant Examiner—Daniel C. Kaufman
Attorneys—Samuel M. Mims, Jr., James O. Dixon, Andrew M. Hassell, Harold Levine, Rene Grossman, John E. Vandgriff, Richards, Harris and Hubbard, V. Bryan Medlock, Jr. and Harold E. Meier ABSTRACT: A search aperture of length dependent upon the average period of seismic waves in a time gate of interest is centered at a record time having a predetermined relation with respect to the record time of a peak in a first trace and the peak is sensed for coincidence with a similar peak on an adjacent trace at any point within said time gate. Only upon coincidence preferably between three or more such peaks are the peaks retained as a confirmed seismic event. In a further aspect, a control function is generated which is dependent upon the amplitudes of such peaks. The control function is then compared against a threshold level and events exceeding such threshold are given significant emphasis relative to other events not exceeding the threshold.

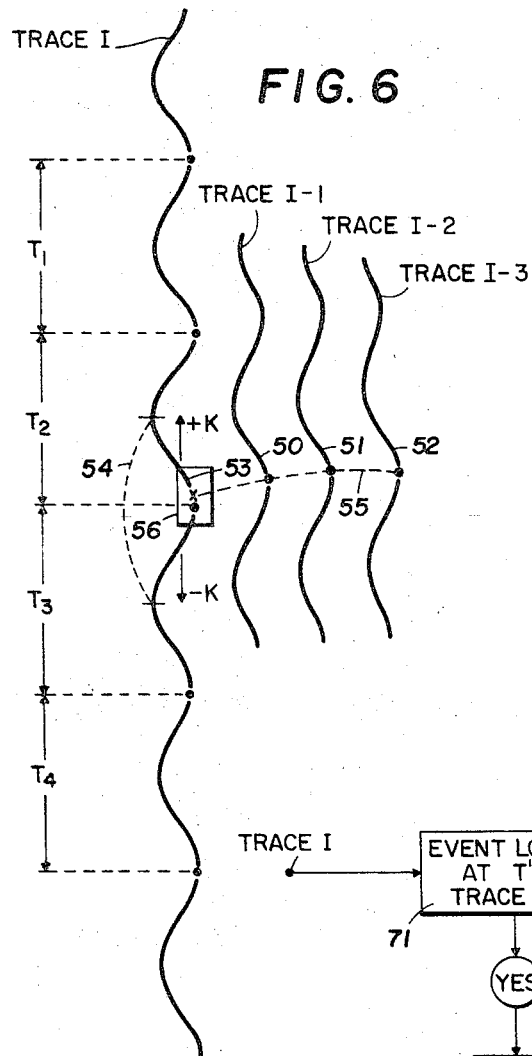
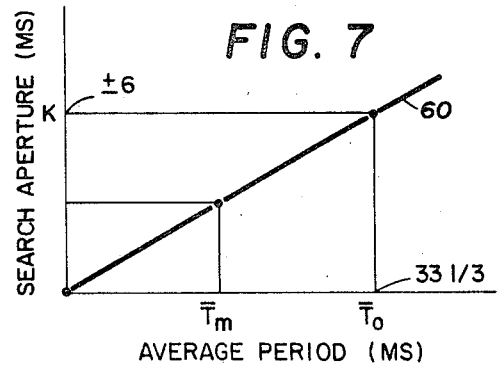
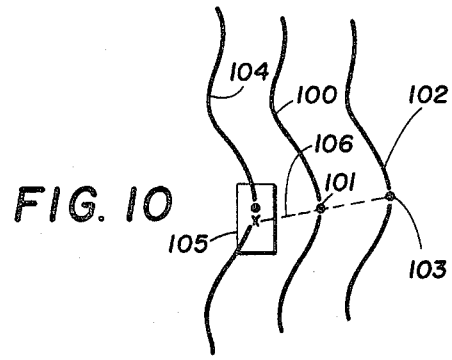
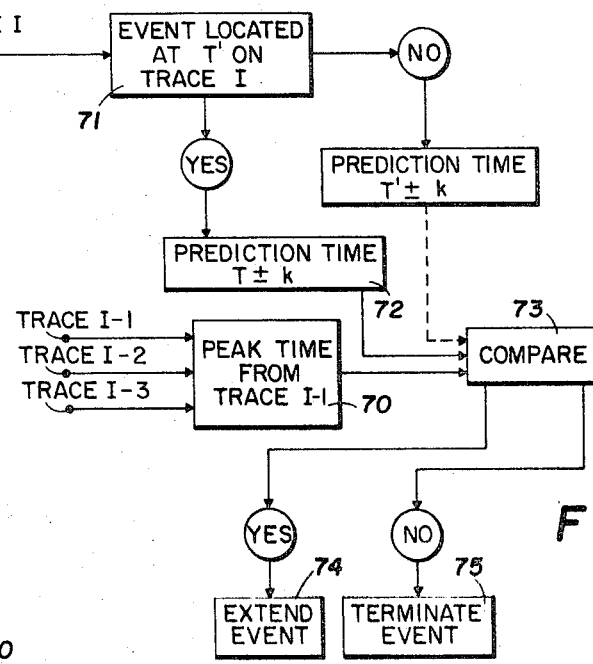
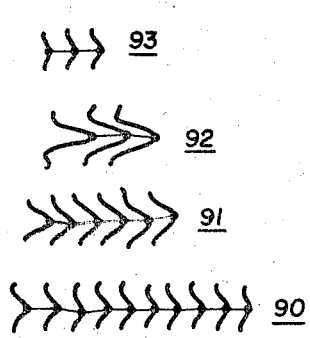

METHOD AND SYSTEM FOR AUTOMATIC SEISMIC REFLECTION PICKING

This invention relates to seismic exploration and more particularly to the identification and display of information indicative of character and location of subsurface reflecting horizons.

In seismic exploration, wiggle-trace seismograms conventionally are produced by recording, as individual traces, the excursions of a spot of light reflected from a galvanometer mirror, deflections of which represent seismic waves detected at a receiving station following generation of seismic waves at a sending station. Collectively, a suite of such traces or undulating lines will indicate the existence of subsurface horizons by time coincidence between traces of waveforms with distinctive character such as like polarity and high amplitude. A seismogram of 24 traces or more may represent coverage along a given seismic traverse of a half-mile or more. In order to gain a perspective of subsurface structure, records secured progressively along a traverse are compared one with another. Conventional corrections are generally applied to such seismograms. Weathering, elevation, and normal moveout corrections are becoming routine. Corrected traces from a plurality of such seismograms, recorded in a side-by-side relation, form a seismic record section. Such seismic record sections have been recorded in various forms, the most common forms being wiggle-trace, variable area, and variable density, and combinations of the same. Ten to 20 or more seismograms thus combined form a seismic section record.

Heretofore, record sections have been developed through the use of correlation methods to produce a section presentation in which small line segments have an inclination equal to the dip of the horizon under observation and a thickness proportional to the correlation coefficient of successive traces along that dip. Such a method is described in Geophysics, Vol. 29, pages 17—37, with a representative section being shown in FIG. 13 thereof.

Thus, while it is known to utilize various types of presentations for seismic record sections, there remains a challenging problem of providing methods and systems for production of seismic sections which may be more reliably interpreted in terms of earth structure.

In accordance with the present invention, means are provided for modifying seismograms to produce pulses at the time of an extrema, such as a peak or other selected polarity portion in each trace. Means are then provided for generating a control signal when one of the pulses on a first of the traces lies within a time gate, dependent in width upon the mean peak separation in the first trace, centered about a predicted time derived from at least two and preferably three adjacent traces. A section plotter is energized in response to the control signal to write time-spaced indicia representative of said peaks to plot only line segments that meet the desired criteria as to alignment of peaks on the original seismogram. The resultant section will be termed herein a "seismic picked section."

In accordance with another aspect of the invention, line segments are recorded with substantial emphasis where the segment mean amplitude or the product of amplitudes of the peaks and the number of successive peaks on adjacent traces which are in alignment exceed a predetermined threshold.

For a more complete understanding of the present invention and for further objects and advantages thereof, reference may now be had to the following description taken in conjunction with the accompanying drawings in which:

FIG. 6 is a plot of portions of four adjacent traces representative of traces from one of the seismograms of FIG. 2;

FIG. 7 is a graph showing a preferred relationship between the average period between peaks on the traces of FIG. 6 and the time gate in which a peak on an adjacent trace must be found in order to extend an event;

FIG. 8 is a flow diagram illustrating event extension operations;

FIG. 9 illustrates relation between length and amplitude in order to provide emphasis on identified events;

FIG. 10 illustrates a simplified operation for preprocessed data; and

Figure 1:
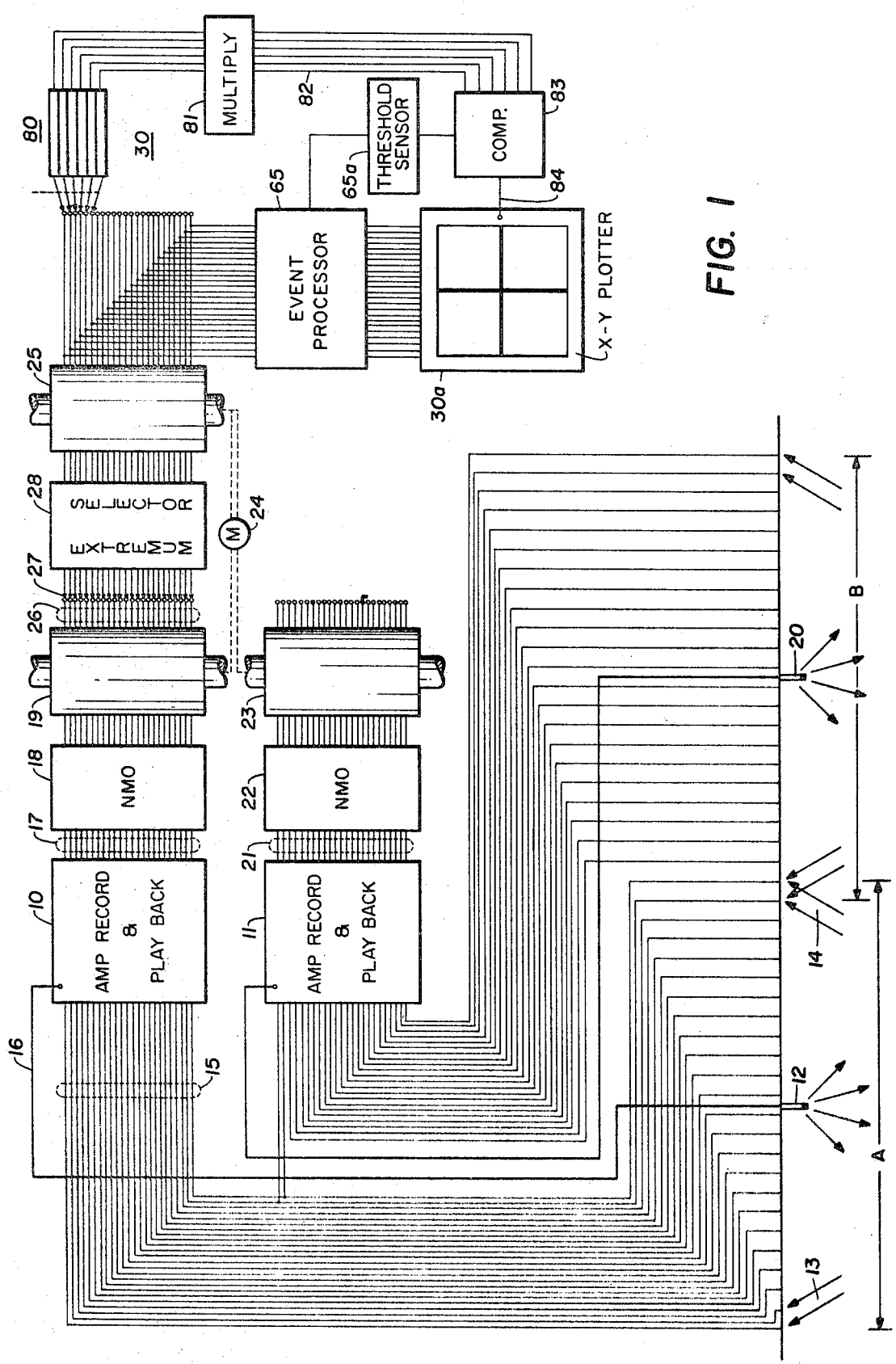
FIG. 1 is a schematic diagram portraying a seismic surveying operation embodying the present invention.

In the setting of FIG. 1, two 24-trace seismograms are produced for inclusion in a composite seismic record section. Additional records will be secured at successive shot points along the traverse. The system has been shown in block form with the elements thereof in their functional relationship for carrying out the invention.

It will be understood that the operations involved may be carried out at least in part by programming a data processor to utilize seismograms which in the field are digitized and placed in reproducible form on a magnetic tape.

In FIG. 1, a first seismogram is obtained and recorded in a unit 10. The second seismogram is obtained and recorded at a unit 11. The first seismogram is produced by detonation of an explosive charge 12. Seismic waves emanate from the charge and travel to subsurface reflecting interfaces from which they are reflected back to the surface, traveling along paths such as the two pairs of paths 13 and 14. The latter pairs of paths lead to two geophones on each end of a spread A. Seismic waves are sensed by detectors preferably uniformly spaced along spread A in a selected seismic traverse having the explosive charge 12 in a suitable shot hole at the spread center. Detector output signals are applied, by way of channels 15, to the input of amplifying-recording-playback unit 10. A time break pulse generated at the instant of detonation of the charge 12 is applied to unit 10 by way of a time break channel 16.

The operations thus far briefly described and the data recorded in unit 10 preferably will be as described in U.S. Pat. No. 2,134,957 to Foote et al., wherein the separate traces are digitized and multiplexed. For the purpose of this description, it will be assumed that the separate seismic traces may be transmitted either serially or in parallel as by channels 17 to a unit 18. In unit 18 the traces are corrected for weathering, elevation, and normal moveout and the corrected traces are stored on a storage drum 19. Such correction operations are well known and will not be described in detail.

In a similar manner, a charge 20 detonated at the center of spread B produces seismic waves which are detected and stored as above-described in the unit 11. The traces are applied by way of channels 21 to a unit 22 which makes the necessary corrections for weathering, elevation, and normal moveout and then transmits the corrected traces to a storage drum 23. Drums 19 and 23 are operated under the control of a motor 24 which also drives a processing drum 25.

The playback channels 26 from drum 19 are connected by way of multichannel switch 27 to a processing unit 28 in which signals are produced representative of extrema, such as conversion of peaks on the sinusoidal or undulating waveforms to spikes. A spike thus produced is located in predetermined time relation to a given peak. For the purpose of the present description, it will be assumed that a positive spike will be recorded on each trace on drum 25 at a record time corresponding with the peak of each positive excursion on the corresponding trace. The traces thus modified and stored on drum 25 are then employed in connection with a computer-plotter 30 to produce a seismic record section preferably of the type illustrated in FIGS. 4 or 5.

Figure 2:
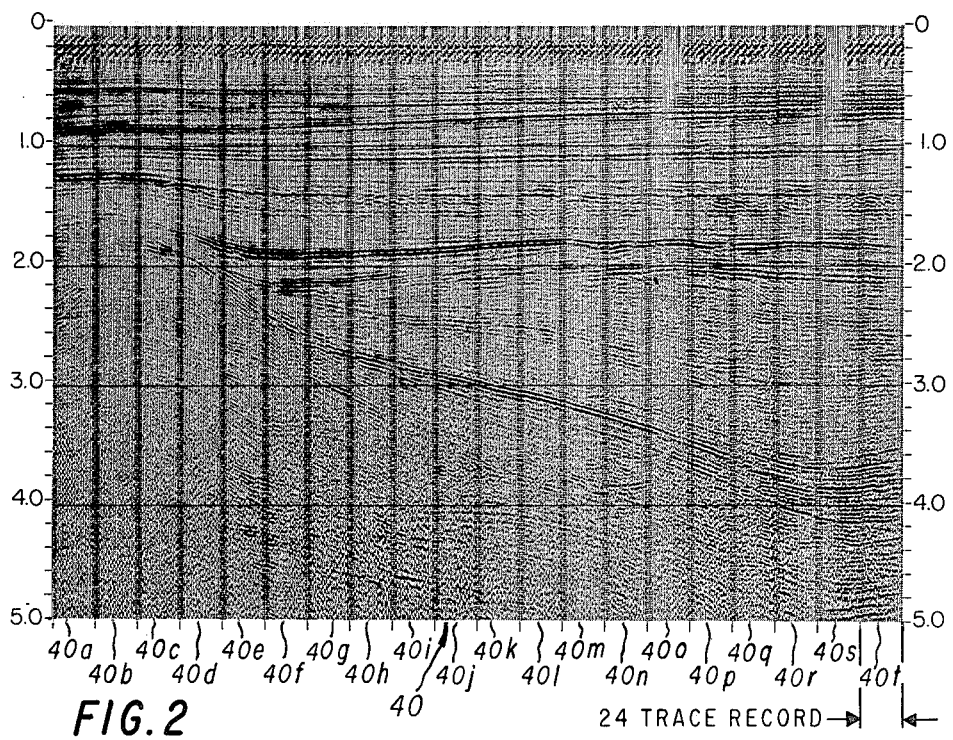
FIG. 2 is a seismic record section of conventional presentation.
Figure 4:
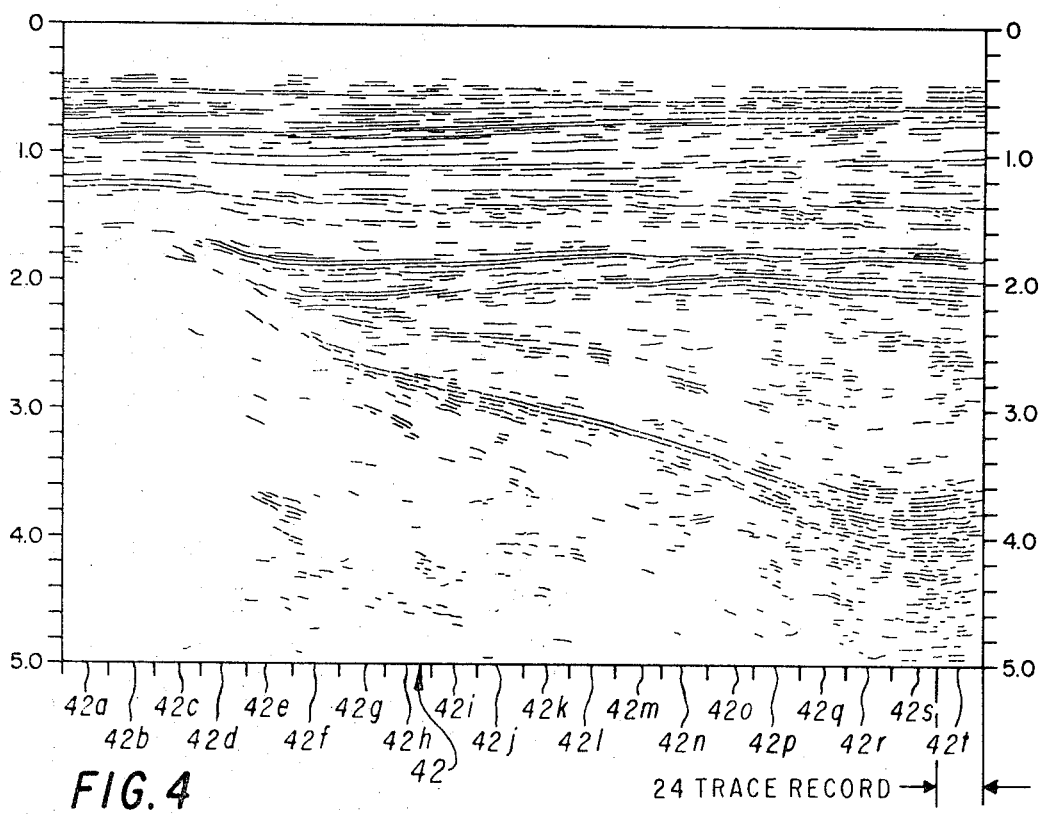
FIG. 4 is a graded section display of the reflector segment shown in FIG. 3 where the grading parameter was numerically equal to 6.0.
Figure 5:
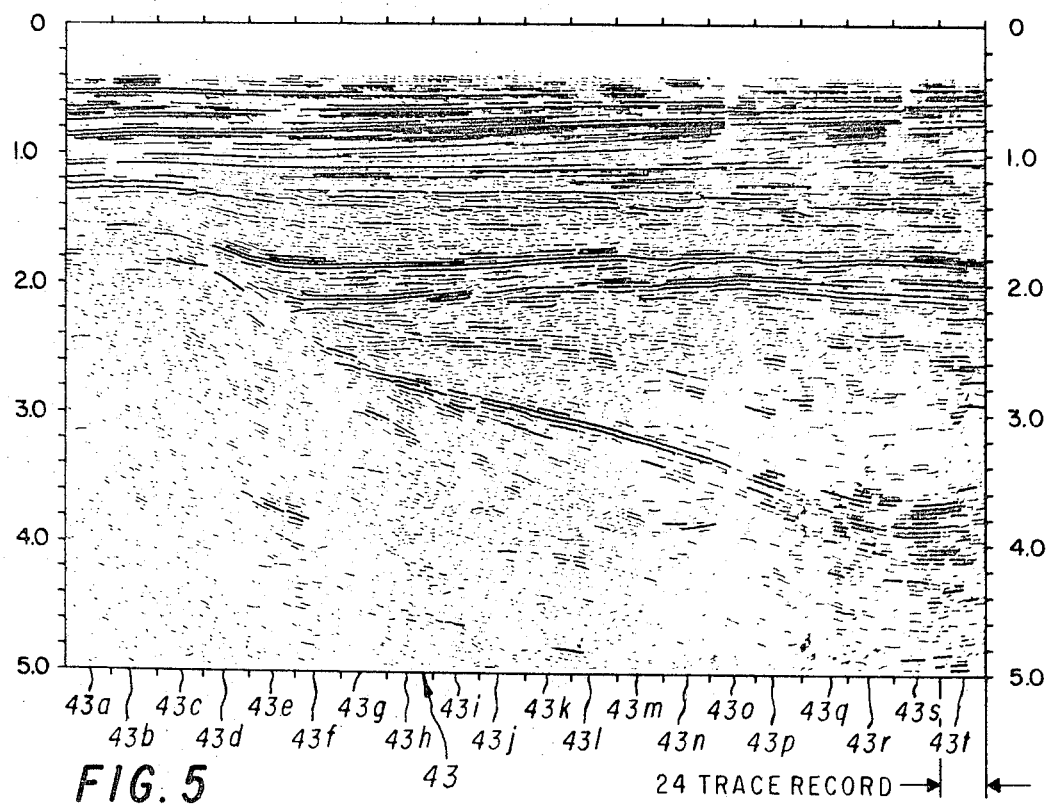
FIG. 5 is the section display of FIG. 4 but in which the line segments are made of varying thicknesses responsive to the product of the number of peaks in alignment and the amplitudes of the peaks exceeding predetermined thresholds.

Before considering the operation of the unit 30 and the character of the sections of FIGS. 4 and 5, it will be helpful to consider the conventional seismic record section shown in FIG. 2. In FIG. 2, 20 23-trace seismograms have been combined to form the record section 40. The seismogram 40A represents the seismic data obtained by detonation of charge 12 in spread A. The seismogram 40B represents the seismic data obtained through detonation of charge 20 in spread B.

The additional records 40C—40T Y operations carried out at successive spreads along the traverse which includes the spreads A and B of FIG. 1. The "reflections" or coherent energy present on the seismograms tends to portray the subsurface structure. Formation of a record section permits the events to be conveniently traced from record to record.

The present invention is directed toward automatically deriving, from records that might be used in a conventional record section, events for a seismic picked section only when they satisfy certain lateral continuity requirements.

Figure 3:
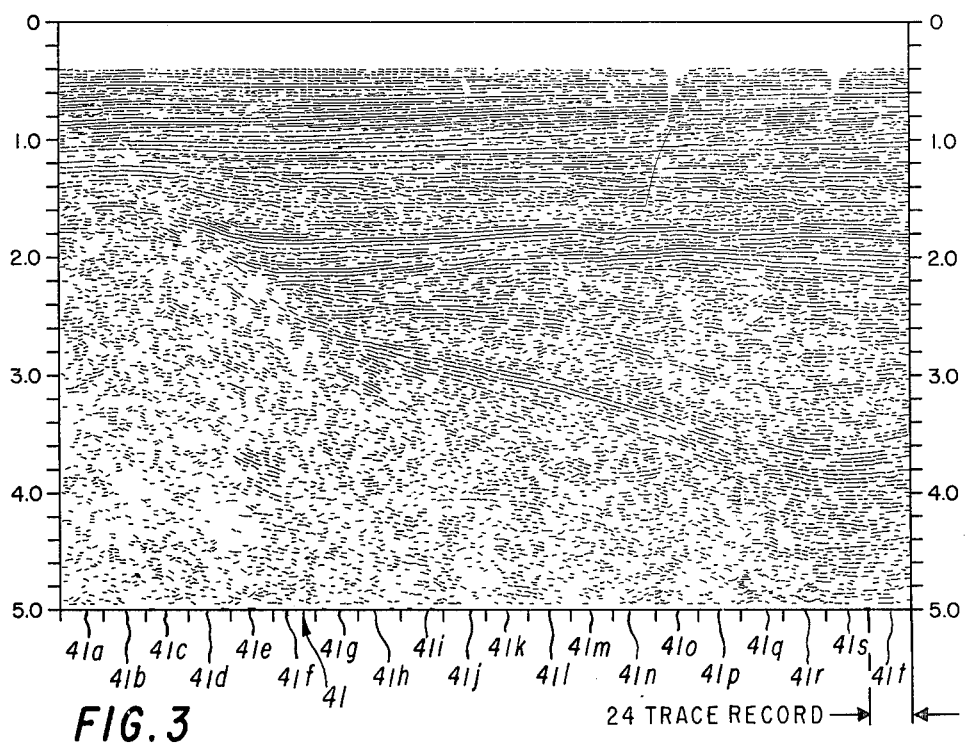
FIG. 3 is a section display of data taken from FIG. 2 but limited to alignment of relative maximum.

FIG. 3 represents the results of a first step in enhancing the record section of FIG. 2. In FIG. 3, line segments have been formed where a seismic event is detected and found to extend across a plurality of traces. Detectors are known for detecting elements of an event and may be of the type described and claimed in U.S. Pat. No. 2,972,733 to Bucy and U.S. Pat. No. 3,018,468 to Jones et al. In such operations, seismic data, such as in FIG. 2, is employed as input data to an automatic event detector. The output of the detector is applied to an $X$-plotter. In the form shown in FIG. 3, the events plotted have some similarities to those produced by the present invention. In such prior art, it is not certain that when a segment is plotted, there is actual presence of an element of the event on each trace across which the segment extends. Thus, the seismic record section 41 will differ in a substantive way from seismic picked sections of the present invention even though they may have many similarities in appearance. The events portrayed by wiggle-traces on the record section of FIG. 2 are recorded as line segments in the section of FIG. 3. Record section 41 was made in an offline operation by energizing a plotter such as a Digital Incremental Plotter of the type illustrated and described in the Calcomp Instruction Manual for Model No. 564, published by California Computer Products, Inc., 1963.

It is apparent from an inspection of the record section of FIG. 3, that a large number of events from FIG. 2 are retained. A seismic picked section of the present invention may actually appear identical with a prior art section but only if unique criteria happen to be present in data from which prior art sections are made.

The present invention is directed to selection of events which fall within predetermined lateral continuity criteria. In FIG. 4, only the most useful events are retained and presented. The section was produced by employing the seismic data from the record section of FIG. 2 suitably processed to energize an $X-Y$ plotter.

The record section 43 of FIG. 5 represents a further enhancement of the data shown in FIG. 3, wherein all of the information is retained but selective emphasis is given to preferred data.

The system for obtaining the improvement represented by the sections 42 and 43 involves the use of automatic seismic event detection operation wherein there is employed a means for picking events while attempting to eliminate from the ensemble all events whose presence tends to confuse or limit the seismic section interpretability.

Secondarily, the present invention provides event grading, preferably based upon two criteria: (1) In general, useful events will have an average amplitude level greater than the average level of the noise; and (2) useful events will tend to have greater spatial continuity than spurious events. That is, a lineup of a given polarity will extend across a greater number of traces than will spurious events. Spurious events, lineups extending over two, three, or four traces with unacceptable moveout, will give an indication of structure where no structure is present. The present invention is specifically directed to elimination from a record section the effect of such spurious events.

A further consideration that is taken into account is a change in signal frequency as a function of time. More particularly, during the time interval of from 0 to 1 second on the section of FIG. 2, the frequency of the seismic reflections will be much higher than in the later section, such as from 4 seconds to 5 seconds. This change in frequency may be employed as will hereinafter be indicated in event grading operations.

In accordance with the present invention, a grade is assigned to each event once the event has been identified. A basic time-varying threshold signal is established for each time gate into which the record section is divided. Preferably the position of the time gate into which the section is divided is determined during the event detection operation. The time-varying threshold signal is compared with a signal which is dependent upon the amplitude of the event and which, in one form, is representative of the product of the length of the event (i.e., the number of traces across which a lineup extends) and the amplitude of the event. The threshold signal is the product of the mean length of all picked events within a specific time gate multiplied by their mean amplitude. The significance of the threshold thus employed lies in the supposition that it will provide a useful reference level against which any individual event can be compared. Events exceeding the threshold level are retained and those which do not are rejected. It is this type of operation on which the unwanted events, retained in section 41, FIG. 3, are eliminated in production of section 42, FIG. 4.

The magnitude of the threshold signal for each time gate preferably is adjusted by an appropriate scaling factor of the basic threshold signal. This provides a quantitative basis for obtaining several event-graded seismic picked sections from the same set of original seismograms. FIG. 5 illustrates such a section. The factors employed in establishing the optimum grading threshold eliminate subjective evaluations of record sections and base the selection of retained events solely upon the physical properties of the record section itself. In practice, several sections may be produced from the data of FIG. 2. An ungraded section, such as FIG. 3, and then several seismic pick sections, of the type shown in FIG. 4, may be produced. The seismic pick sections will differ one from another in that the reference threshold signal is different in one section from that employed in another so that one seismic pick section will include more data than another.

The data preferably will be conditioned or preprocessed as by filtering to minimize spurious frequencies which might render measurements of periods erroneous. As above noted, the processed data are in a digital format obtained from in-line, equally-spaced groups of seismometers.

In this form, a seismic section may be considered to be an $S \times T$ matrix $M_{st}$, where each element is the seismic amplitude of trace $s$ at the time $t$. A seismic reflection is another $S \times T$ matrix, $R_{st}$, with at least $S-(T-1)$ zero elements and no more than one nonzero element in any trace. The intersection of the set of all possible reflection matrices constitutes the seismic reflection cross section matrix $C_{st}$. The positions of the nonzero elements of $C_{st}$ may be mapped on to a plane. This mapping, together with scale conversions, displays for identifying and grading the various reflectors, and any desired annotation forms the seismic reflection cross section which is a very important display in any seismic exploration program.

The criteria employed for the detection of the reflections contained in a seismic section, i.e., the definition of the matrix $C_{st}$, are:

1. For each trace $N$ in $M_{st}$, the ordered set of elements is defined which is most likely to contain the nonzero elements of the column vector $C_{Nt}$. The matrix of these ordered sets will be denoted by $^{(1)}M_{st}$. The information required for this definition is provided by a priori geologic and geophysical experience in the area of interest. For no a priori knowledge each set would include $T$ elements. However, it is possible to restrict consideration to the sets $P_s \leq t \leq Q_s$ where $P_s > 1$ and $Q_s < T$ are integral numbers for $s = 1, 2, 3, ... S$;

2. For each trace in $^{(1)}M_{st}$, the ordered set of elements is defined which consists only of relative maxima (peaks) located between $P_s$ and $Q_s$ in trace $s$. The total number of maxima $$\sum_{s=1}^{S} L_s$$

is, in general, much smaller than the total number of restricted elements $$\sum_{s=1}^{S}(Q_s - P_s) ;+1 \text{ and}$$

3. The matrix of relative maxima, $^{(2)}M_{st}$, is tested for the lateral continuity of its elements. If a nonzero element $^{(2)}M_{nm}$ exists and is an element in $C_{st}$, then a second nonzero element would be expected in the ordered set $\{^{(2)}M_{(n+1,m-I)}, ^{(2)}M_{(n+1,m+I)}\}$ where $I$ is a suitably smaller integer. Such a procedure may be extended to test all nonzero elements of $^{(2)}M_{st}$ for lateral continuity.

The matrix formed from the nonzero element of $^{(2)}M_{st}$ which indicated lateral continuity, together with zeros in all other locations, is the required cross section matrix $\hat{C}_{st}$.

SEISMIC DETECTION BASED ON THE FOREGOING CRITERIA

In a particular $S \times T$ seismic-section matrix $M_{st}$, two numbers $P$ and $Q$ are selected such that $P_s = P$ and $Q_s = Q$, for $s = 1, 2, 3, ... S$. Applying these two constants to $M_{st}$, $^{(1)}M_{st}$ is generated. Then the matrix $^{(2)}M_{st}$ of relative maxima is determined. Relative minima (troughs) as well as the relative maxima may be selected, but, in general, one type of extrema is not preferable to the other.

To establish the cross section matrix $C_{st}$, the matrix $^{(2)}M_{st}$ is tested for lateral continuity in the following manner. If $^{(2)}M_{(n-4, t_4)}$, $^{(2)}M_{(n-3, t_3)}$, and $^{(2)}M_{(n-2, t_2)}$ are elements of a particular reflector, the geometric configurations of these three elements is employed in determining the least-squares-fit straight line to the three points. This line is extrapolated to identify the element $^{(2)}M_{(n-1, \hat{t}_1)}$. Then the elements in the ordered set $$\{^{(2)}M_{(n-1, \hat{t}_1+\Delta)}, \ ^{(2)}M_{(n-1, \hat{t}_1-\Delta)}\}$$

are searched for the existence of a nonzero element whose time position is closest to $\hat{t}_1$. If a nonzero element $^{(2)}M_{n-1, t_1}$ exists, the procedure is repeated. However, this time the elements $^{(2)}M_{(n-3, t_3)}, ^{(2)}M_{(n-2, t_2)}$, and $^{(2)}M_{(n-1, t_1)}$ are used to define the next element $M_{(n, \hat{t}_0)}$. In this manner, each consecutive element of an individual reflector segment is defined. The procedure is terminated and a new reflector segment initiated when a nonzero element is not located within the bounds of the ordered set $$\{^{(2)}M_{(n-1, \hat{t}_1+\Delta)}, \ ^{(2)}M_{(n-1, \hat{t}_1-\Delta)}\}$$

To initialize a reflector segment, a different procedure is followed since the three points necessary to define a straight line have not been established. If $^{(2)}M_{n, t_0}$ is the first element to be tested, a second element is defined as $^{(2)}M_{n-1, t_0}$ and the ordered set $\{^{(2)}M_{(n-1, t_0+d)} \ ^{(2)}M_{(n-1, t_0-d)}\}$ is examined for a nonzero element whose time position is closest to $t_0$. The parameter $d$ defines the maximum expected dip within the record section and is in general larger in magnitude than the parameter $\Delta$. If $^{(2)}M_{(n-1, t_1)}$ is this nonzero element, a straight line is established with the constraint that it pass through both $^{(2)}M_{n, t_0}$ and $^{(2)}M_{(n-1, t_1)}$. The intersection of this line with the next consecutive trace defines the third element $^{(2)}M_{(n-2, \hat{t}_2)}$ and the ordered set $$\{^{(2)}M_{n-1, \hat{t}_2+\Delta}; \ ^{(2)}M_{n-1, \hat{t}_2-\Delta}\}$$

is examined for a nonzero element. After the third element has been found, all consecutive elements are located by the procedure previously described.

If a nonzero element is not found while attempting to define the second or third element of a reflector segment, then the first element $^{(2)}M_{n, t_0}$ is excluded from any further operations and the initiation procedure starting with a previously untested element attempts to generate a new reflector segment. This is repeated until all elements in the $^{(2)}M_{st}$ matrix have either been tested to initiate segments or included within previously defined segments.

The set of all reflection segments identified in the foregoing manner from the original matrix $M_{st}$ constitute an estimate of the cross section matrix $C_{st}$. They are stored on a magnetic tape, and then approximately scaled and displayed by a digital incremental plotter in the form of line segments. Each line segment corresponds to a reflector segment. The reflector itself consists of one or more of these segments.

In general, the number of picked reflection segments generally exceeds the number which would be conventionally carried for further analysis such as migration or mapping. It is thus desirable to assign a grade to each reflection segment. The grade preferably is a function of its average amplitude and may be made dependent upon its spatial span or length. The graded segment is compared with an appropriate threshold signal. If the segment grade exceeds this threshold signal, then the segment is carried forward in the production of a section. Conversely, the segment is rejected and not used if its grade is less than the threshold signal.

A length threshold may initially be incorporated in the picking logic. That is, at least three consecutive elements must satisfy the picking logic in order to define a reflection segment. After all reflector segments have been picked, each one is given a grade $$G_i = \sum_{k=1}^{n} A_{ik}$$

where $n$ is the number of elements in segment $i$ and $A_{ik}$ is the amplitude magnitude of element $k$. Physically $G_i$ is the product of the mean amplitude of segment $i$ times its length, i.e., the number of elements in segment $i$. By incorporating length in the grade as well as the mean amplitude, weak (low mean amplitude) but relatively long reflector segments are more likely to pass the threshold test. On the other hand, short segments with relatively low to average mean amplitude, generally characteristic of picked random noise, are more likely to be rejected.

A threshold signal for a particular record section is determined directly from the picked elements. Its magnitude is time-varying to take into account gain differences as a function of record time.

In order to define the time-varying thresholds, each of the $S$ traces is first divided into $R$ disjoint sets of consecutive elements. The arbitrary integer $R$ usually is less than five in magnitude. Each set is restricted to contain $(P-Q)/R$ elements from the matrix of relative maxima $^{(2)}M_{st}$. The average terminal time position $t_r$ of each disjoint set is computed as $$\frac{1}{S}\sum_{s=1}^{S} t_{sr} \qquad r = 1, 2, \ldots R$$

where $t_{sr}$ is the terminal time of disjoint set $r$ contained in trace $s$. The set of $T_r$'s computed in this manner serve to quantitatively subdivide a record section into $(R-1)$ distinct time zones.

Average picked extrema amplitudes $$A_{sr} = \frac{1}{N_r} \sum_{t=1+T_{r-1}}^{T_r} \hat{C}_{s,t}$$

are then determined for $s=1, 2, \ldots, S$ and $r=1, 2, \ldots, R$. The number $N_r$ is the number of elements contained in $C_{s,t}$ between times $T_{r-1}$ and $T_r$. Finally, these averages are subjected to a space average to determine $$A_r = \frac{1}{S} \sum_{s=1}^{S} A_{sr}, \quad r = 1, 2, \ldots R$$

The threshold $A_r$ applies to all segments picked in the time zone $T_{r-1}$ to $T_r$. In practice, it has been found useful to weight $A_r$ by a variable positive rational number $X$ in order to generate several segment graded displays. A graded display is defined by the set of reflection segments whose individual grades $G_i$ exceed the product $X \cdot A_r$. When $X$ is small, very little segment discrimination is attained. However, a large $X$ value will permit only those segments which correspond to strong or laterally persistent reflectors to be displayed or retained for further analysis.

In FIG. 6, portions of four traces have been illustrated wherein an event has been identified on traces I+1, I+2, and I+3. The event is comprised of peaks 50, 51, and 52, respectively. With such an event having been identified, it is desired, in accordance with the present invention, to determine whether or not the event can be extended, within proper limits, to trace I. As illustrated, a peak 53 is present on trace I. However, it may happen that, in the particular time interval, there would be no peak and that the trace would have the character represented by the dotted portion 54. In accordance with the present invention, if the peak actually exists within the limits set, then the event will be extended to trace I and will then be checked to determine whether or not it extends to trace I−1 (not shown).

In accordance with the present invention, a time gate is generated centered at the predicted time, i.e., the record time at which the line 55 intersects the time axis for trace I. The gate has time span dependent upon the average period of the seismic waves represented on trace I. More particularly, the periods $T_1$, $T_2$, $T_3$ and $T_4$ represent the intervals between successive peaks on trace I with the peak 53 being at the center of the four intervals. Signals are generated representative of the time intervals $T_1-T_4$ and the gate 56, in the form of a gate signal, is then generated to have a length which is related to the average period $T_m$ in accordance with the relationship illustrated in FIG. 7.

In FIG. 7, the relationship between $T_0$ and $K$ is assumed and is based upon general knowledge of the characteristics of data from the area in which the investigation is conducted. In accordance with the best mode of the operation thus far attained, a relationship of $K=\pm 6$ milliseconds at $T_0=33\frac{1}{3}$ milliseconds has been employed. Thus, as shown in FIG. 7, the line 60 represents a preferred relationship between the average period between peaks preceding and following the given record time of interest and the length of the gate 56. If, within the gate 56, a peak is identified on trace I, the event represented by the line 55 of peaks is extended onto the next succeeding trace I+1. Preferably at least three traces will be employed for establishing the presence of an event and for determining the point at which the gate 56 should be centered on the fourth or succeeding trace.

The operation preferably will be carried out in accordance with the foregoing criteria on a data processor wherein, as indicated in FIG. 8, traces I−1, I−2, and I−3 are employed in a first step 70 wherein the peak time for an event is determined. That is, the record time at which the peak 50 occurs on trace I−1, FIG. 6. Having determined, on the basis of at least-squares-fit of the peaks 50, 51, and 52, the time at which a peak would be expected on trace I, a gate 56 of length $2K$ is applied to trace I in the step 71. The step 72 is carried out to determine whether or not a peak on trace I lies within the gate $2K$ centered at time $T$. The resultant times from steps 70 and 72 are compared in step 73. If the comparison is valid, i.e., if the peak on trace I lies within the time gate 56, FIG. 6, based upon the record time from trace I−1, then the event is extended in step 74 to trace I. If the peak does not occur within the limits of the gate 56, then the event is terminated in step 75 and the search moves on, for example, to successive peaks along traces I−1, I−2, and I−3.

The foregoing operations are carried out in the processor 65 of FIG. 1. Processor 65 preferably will be a digital computer programmed in accordance with the foregoing specifications to carry out the successive operations for identifying events and the extent thereof throughout the length of the several seismograms in the manner shown in FIG. 11.

In a further aspect of the invention, an additional operation may be carried out. This operation is indicated diagrammatically in FIG. 1 wherein the amplitudes of events are sensed as generated by a bank of units 80 for each of six traces. More or less than six traces may be employed. The outputs of the sensing units are applied to a multiplier 81. A threshold signal, above described, is produced by unit 65a. When the output of the multiplier 81 exceeds the threshold signal as determined by comparator 83, then a control function on channel 84 is applied to the recorder 30a and causes the event producing the high output product to be recorded by the recorder 30a with selective emphasis relative to other events. It is this type of emphasis that is clearly depicted in FIG. 5 wherein events which have extended length or have relatively short lengths with high amplitude are recorded with line widths much greater than the events whose amplitude-length product does not exceed a given threshold. As above described, this threshold signal is a time-varying threshold and is based upon the general level of the signal amplitudes for given record times.

As illustrated in FIG. 9, the combination of an extended number of traces having a lineup such as represented by the set 90 would represent a large length-amplitude product. In the set 90, 10 traces of relatively low amplitude have peaks of intermediate amplitude and thus would provide a length amplitude produce of value corresponding with that of set 90. In set 92, only three traces are aligned but they have considerably larger amplitude and thus the length product would correspond with that of sets 90 and 91. In contrast, the lineup of three peaks in set 93 of low amplitude would provide length amplitude product which would not exceed a threshold signal comparable to that against which the sets 90—92 are graded. In accordance with this aspect of the invention, sets 90—92 would be employed to form line segments of higher emphasis on a record section by control of the recorder by a length-amplitude product comparison signal. Set 93 might be used to form a low emphasis line segment.

While the foregoing has been based upon the proposition that an event would be extended based upon at least three traces to a fourth, it has been found that where the data is exceptionally good and where it is preprocessed as by wideband velocity filtering as described in Geophysics, Vol. 28, No. 6, Dec. 1963, pages 948—947, then acceptable operations can be carried out by identifying an event on two traces and extending that to the next adjacent trace. This operation is illustrated in FIG. 10 wherein a trace 100 has a peak 101 and trace 102 has a peak 103 and these data are applied to trace 104. Where two traces are employed, the prediction time for trace 104 would be the time on a straight line connecting peaks 101 and 103. Gate 105 is then centered on line 106. However, the operation set forth in FIGS. 6—9 represents the more general case.

Figure 11:
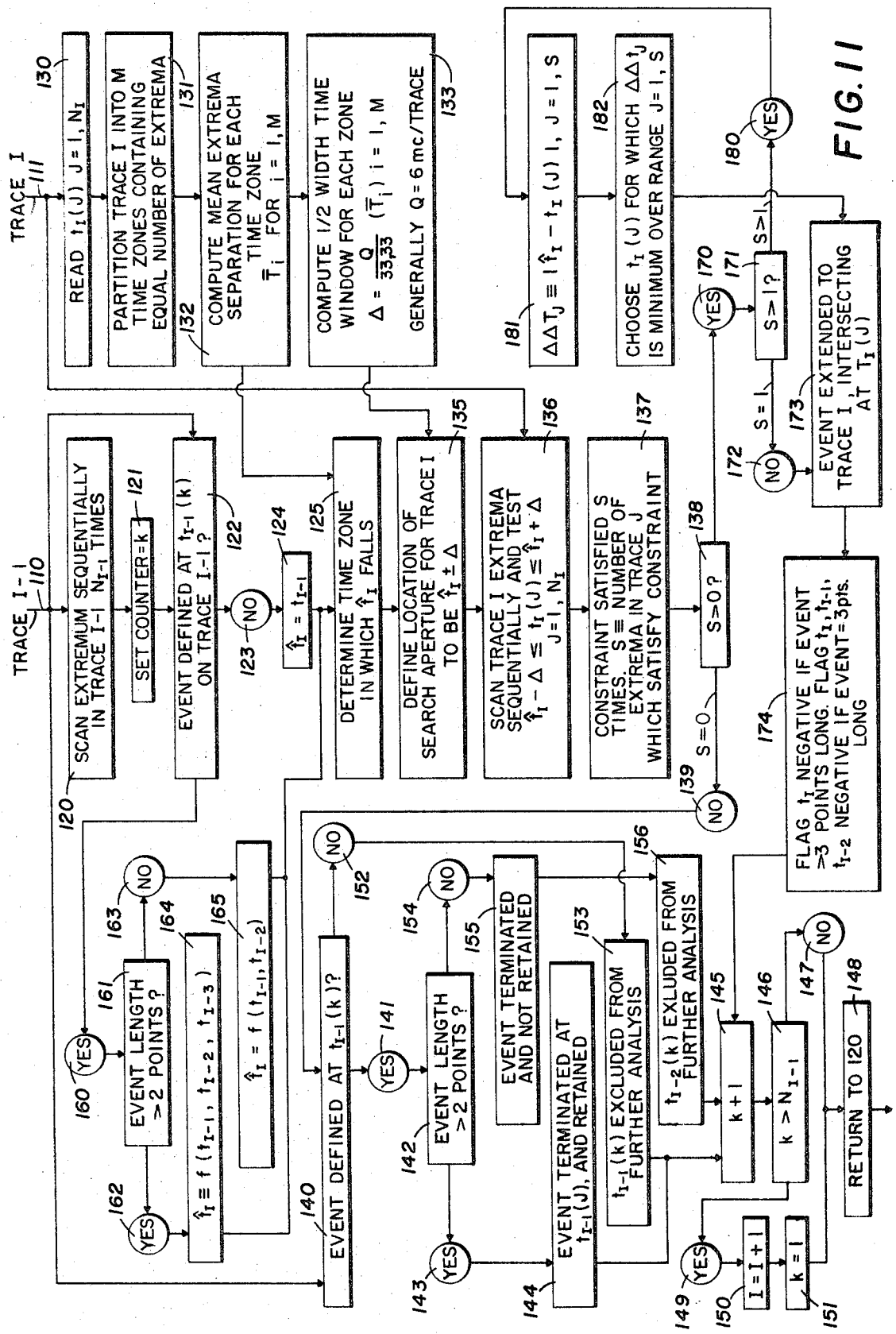
FIG. 11 is a flow diagram for event extension operations in a digital computer.

In FIG. 11, the flow diagram illustrates extension of an event from one trace to an adjacent trace upon satisfying the conditions and constraints noted therein with the legends particularly related to computer operations. Two input channels 110 and 111 represent flow channels for data on trace I−1 and trace I, respectively.

The traces are first processed and effectively filtered to select extremums. For the purpose of this description, the extremum selected will be peaks. In step 120, trace I−1 is scanned and a number $k$ is produced representative of the position of a given peak in a train of peaks comprising trace I−1. That is, in an initial scanning step, a counter is set to the number $K$. In step 122, the record time of peak $K$ is examined to see if it has been previously "flagged," indicating the existence of an event that previously has been used in the section production operation. In practice, such record time is flagged by applying a negative sign thereto. All other peaks are positive since, on a seismic record, only positive record time exist. Thus, if peak k has not previously been flagged as an element of an event, then an indication in step 123 is provided whereupon, in step 124, a determination is made as to the estimated time at which a peak should appear on the next consecutive trace I. This predicted time is then employed in step 125 to determine the time zone in which the predicted time falls.

Information from trace I is also employed in step 125 as follows. Trace I is employed in step 130 wherein all of the peaks in trace I are read-in to provide a signal representative of such total number of peaks. The signal representing the total number of peaks is then divided, in step 131, into M equal units of peaks. Each such unit or time zone preferably contains equal numbers of peaks.

In step 132, the mean or average period between the peaks in each time zone is determined to produce an average separation interval $\overline{T}_i$.

In step 133, a search aperture is determined in accordance with the relations set forth in FIG. 7 and expressed as $$\Delta = \frac{Q\overline{T}_i}{33.33}$$

, where as above indicated $Q$ is a constant and, from experience, has been found to be from the order of 6 milliseconds per trace.

The results from step 131 are employed in step 125 to determine in which time zone the estimated time falls.

Having determined the time zone in step 125, then step 135 involves generating the limits of the search aperture for trace I which will be $\hat{t}_1 \pm \Delta$. Thus, in step 133, the limits of the search apertures are set.

In step 135, the location of the search aperture is set. In step 136, trace I is scanned to identify the peaks in trace I and to determine whether or not the peaks lie within the search aperture.

In step 137, a test is made to determine whether none, one, or more peaks lie within the search aperture. In step 138, a first test is made to determine whether the number of peaks exceeds zero, that is, to determine if at least one peak lies within the search aperture. If there is no peak within the search aperture as indicated in step 139, then in step 140, again a check is made as to whether or not an element of an event had been defined as earlier checked at operation 122. If the answer is yes, as indicated in step 141, then in step 142, a check is made as to whether or not the event thus defined has a length in excess of two elements. If the answer is yes in step 143, then in step 144 the event is terminated at trace I—1 and retained. In the latter case, a counter, employed in step 121, is incremented as indicated by step 145.

In step 146, the number in the counter is then tested to determine if it exceeds the total number of peaks in trace I—1. If it does not exceed the number of peaks as indicated in step 147, then in step 148, the sequence returns to step 120 and the process is then repeated for the next peak counted in trace I—1. If the counter for step 145 exceeds the number of peaks and the answer is yes in step 149, then the trace counter is incremented by one as indicated in step 150 to shift the operation to the next trace since all peaks in trace I—1 have been examined. The counter, in step 121, is initialized back to one, the result being indicated in step 151.

In step 140, if no event was defined at the time of pulse k on trace I—1, then, as in step 152, pulse k in trace I—1 is excluded from further analysis by step 153.

Further, if the number of elements in the identified event does not exceed two points as indicated in step 154, a negative indication is employed by step 155 to terminate the event and the event is not retained. Further, as a result of step 155, and as indicated in step 156, the peak $t_{i-2}(k)$ is also excluded from further analysis and the counter employed in step 145 is incremented.

The foregoing discussion has been based upon operation 122 as having involved an event not previously identified. However, as indicated in step 160, if the element on trace I—1 has previously been identified, then in step 161 inquiry is made as to whether or not the event is of length in excess of two points as indicated by step 162, or less than two points as indicated by step 163. In the former case, step 164 provides a predicted time $\hat{t}_i$, based upon the flagged times of peaks in three adjacent traces. In step 165, a predicted time $\hat{t}_i$ is provided based upon elements of the flagged event in two adjacent traces $t_{i-1}$ and $t_{i-2}$.

In the foregoing description, it was assumed that there were no peaks in the search aperture so that the operation proceeded from step 138 to step 139. However, if a peak on trace I is identified within the search aperture as indicated in step 170, then a check is made in step 171 to determine if there is only one peak within such aperture or if there is more than one peak. If there is only one peak, then through steps 172 and 173 the previously flagged event is extended to trace I, intersecting at $t_i j$). Also when the event is extended in step 173, step 174 involves flagging the time of peak k on trace I with a negative sign. In addition, the times of peaks k on trace I—1 and on trace I—2 are also flagged with a negative sign if the event equals three elements. If the event does not equal or exceed the three elements, then none of the record times for this particular peak are flagged.

It should be understood that in pursuing this operation, the event is not flagged but the individual elements of the event are flagged by applying a negative sign to the record time for such element.

When more than one peak appears in the search aperture, then through step 180 and 181 a plurality of comparisons are carried out to determine the differences between the predicted time and the times of peaks in the search aperture. Only one peak is used where more than one peak is present in the aperture. The peak which is used is that peak which occurs at a time which differs from the predicted time less than the time occurrences of any other peak in the aperture. The event thus identified is then employed in step 173 for extension of the event as above described.

The method embodied in the operations set forth above, particularly in connection with FIG. 11, involves reproduction of the seismic traces as electrical signals and generating an electrical time gate that is proportional to the separation between peaks in one electrical signal in the time region of an event identified on adjacent traces. The time gate is centered at a predicted time the prediction being based upon the times at which the event occurs on the adjacent trace. At output signal is then generated on coincidence between a peak in the one signal and the time gate.

When carried out in digital form, pulses representative in time of the occurrence of peaks of a selected polarity from each trace are employed. A control signal is generated when one of the pulses on a first of the traces lies within the above time gate. In response thereto, time-spaced indicia representative of reflecting horizons are then utilized only in response to such control signal. The method assures that the elements of reflection are present on each trace across which an event extends before recording an event as a continuous segment on a record section.

While the invention has been described in connection with a particular set of operations, it will be understood that modifications may be made in the method and system described and claimed herein without departing from the intended scope of the appended claims.

We claim:

1. In producing a display of subsurface earth structure from a set of seismograms in which adjacent seismic traces represent seismic waves detected at adjacent locations spaced along a traverse, the method which comprises in an automatic data processing machine:

a. generating pulses from each of said seismograms at the time of each peak of a selected polarity in each trace;
b. generating a control signal when one of said pulses on a first of said traces lies within a time gate which is dependent in width upon mean peak separation in said first trace and centered at the predicted time for one of said pulses on said first trace; and
c. producing time-spaced indicia representative of reflecting horizons on said seismogram only in response to said control signal.

2. The method of claim 1 wherein said gate is centered on said first trace at a point lying on a least-squares line connecting pulses on three adjacent traces.

3. The method of claim 1 wherein said time-spaced indicia is enhanced in response to the amplitudes of such pulses exceeding a predetermined threshold signal.

4. A system for producing a display of subsurface earth structure from a set of seismograms in which adjacent seismic traces represent seismic waves detected at adjacent locations spaced along a traverse, which comprises:
   a. means for generating from each of said seismograms electrical signals representative of the time occurrence of each peak of a selected polarity in each trace;
   b. means for generating a control signal when one of said electrical signals on a first of said traces lies within a time gate which is dependent upon the mean peak separation on said first trace at a point lying on a least-mean-squares line connecting pulses on three traces adjacent to said first trace;
   c. an *X–Y* plotter for writing time-spaced indicia representative of reflecting horizons on said seismogram; and
   d. means for actuating said plotter only in response to said control signal.

5. A system for producing a display of subsurface earth structure from a set of seismograms in which adjacent seismic traces represent seismic waves detected at adjacent locations spaced along a transverse, which comprises:
   a. means for generating from each of said seismograms pulses at the time of each peak of a selected polarity in each trace;
   b. means for generating a control signal when one of said pulses on a first of said traces lies within a time gate which is dependent upon the mean period between peaks on said first trace and centered in predetermined time relation to the time of one of said pulses on said adjacent trace;
   c. an *X–Y* section plotter adapted to write time-spaced indicia representative of reflecting horizons on said seismograms; and
   d. means for actuating said plotter only in response to said control signal.

6. In a seismic section display, the method of verifying the extension of a seismic event from a plurality of consecutive traces to an adjacent trace which comprises in an automatic data processing machine simulating the operation of:
   a. reproducing said adjacent trace as an electrical signal;
   b. generating an electrical time gate which is proportional to the mean separation of peaks in said electrical signal in the time region of said event;
   c. centering said time gate at a predicted time based upon the times of said event in said consecutive traces; and
   d. generating an output signal upon coincidence between a peak in said adjacent trace and said time gate.

7. The method according to claim 6 wherein the length of said gate is about one-third of said mean separation.

8. The method of claim 6 wherein said consecutive traces are at least three in number.

9. The method of claim 6 wherein said gate is centered on said adjacent trace at a point lying on a least-squares line connecting peaks on three of said consecutive traces.

10. The method of claim 6 wherein said electrical signal comprises pulses only at peaks of one selected polarity.